Feb. 24, 1942. M. F. A. JULIEN 2,273,869
RESILIENT SUPPORT
Filed Jan. 23, 1939 2 Sheets-Sheet 1
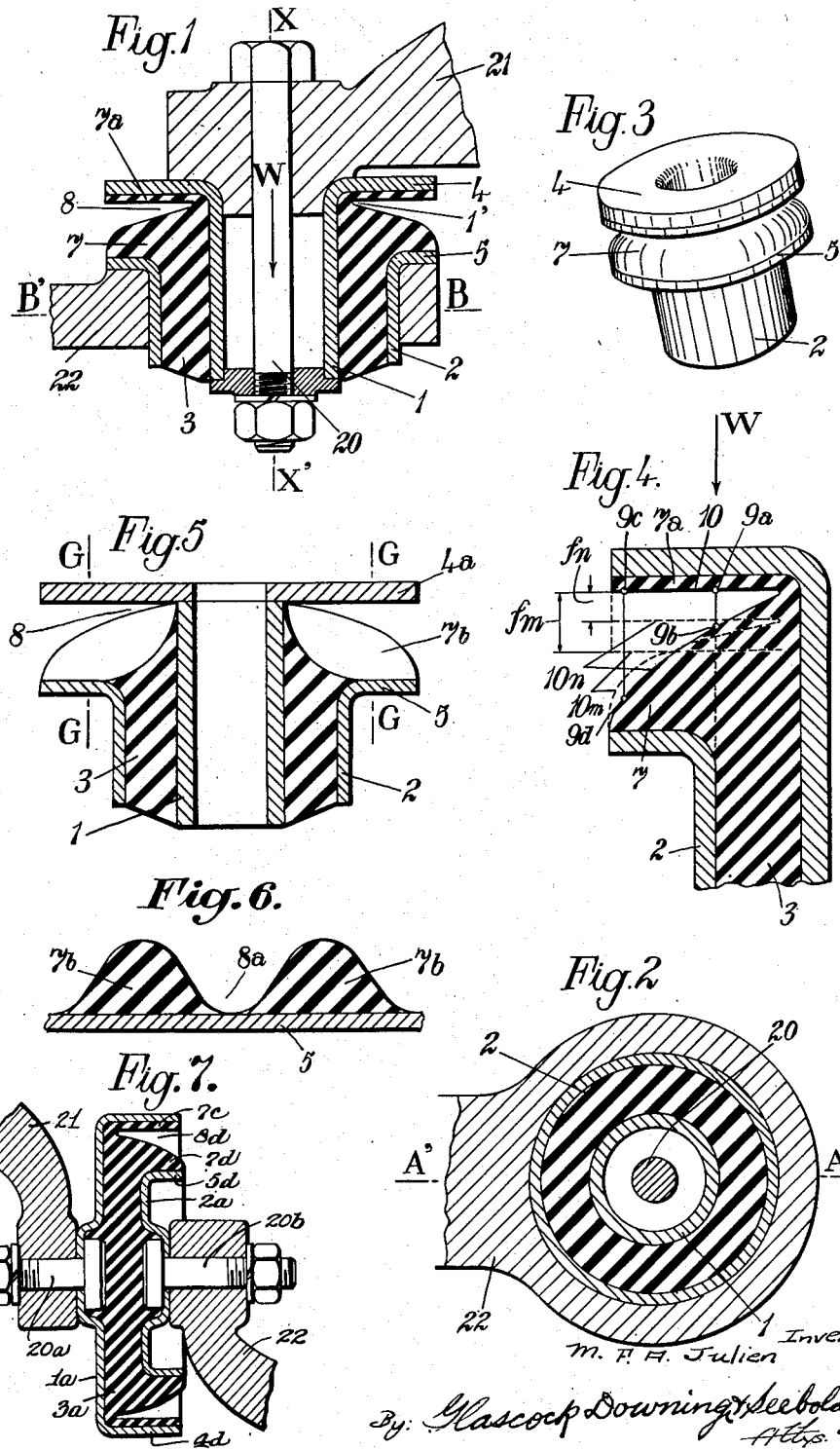

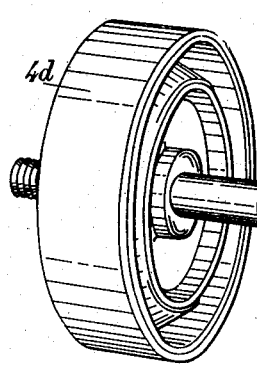
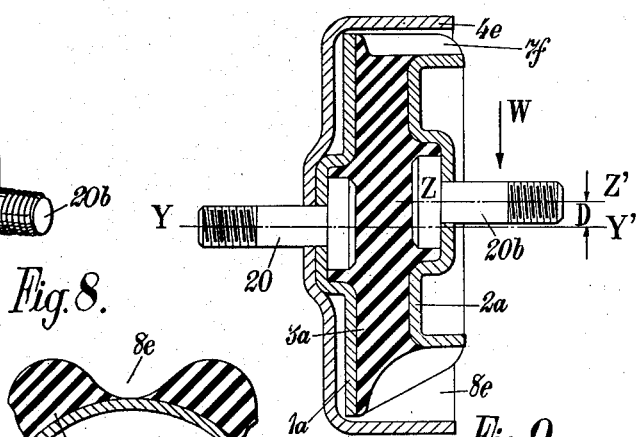
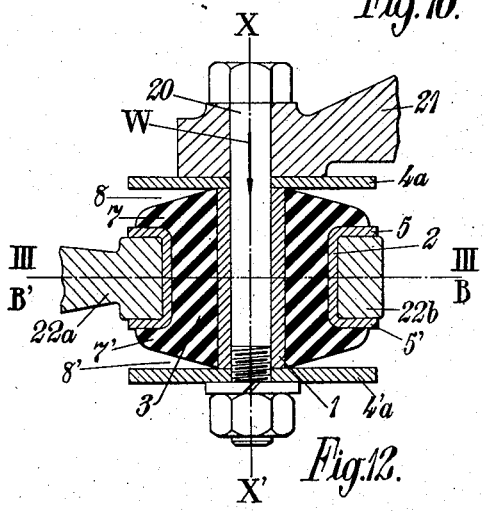
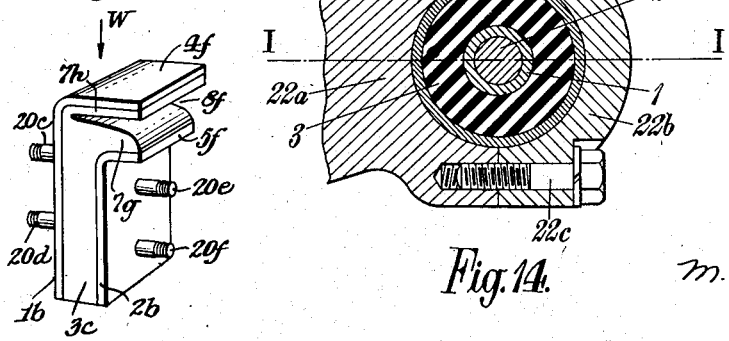

Patented Feb. 24, 1942

2,273,869

UNITED STATES PATENT OFFICE 2,273,869

RESILIENT SUPPORT

Maurice François Alexandre Julien, Paris, France

Application January 23, 1939, Serial No. 252,481
In France January 27, 1938

4 Claims. (Cl. 248—22)

In the suspension of machines or motors it has already been proposed to utilise resilient supports consisting of layers of rubber or other resilient material of substantially constant thickness adhering by vulcanisation or otherwise to rigid frames which are secured to a suspended body and the structure or framework supporting the said body respectively with devices for limiting the relative tangential displacement of the two frames due to the shearing deformation of the resilient material under the action of permanent or variable loads to which they are subjected. The elasticity of the support is thus limited or even suppressed starting from a certain relative displacement of the two frames.

These devices are sometimes completely independent but others, on the contrary, form an integral part of the support. In the latter type a first category provides rigid surfaces of suitable form and dimensions which progressively come into contact with a free surface of the resilient material subjected to the shearing deformation, so as to oppose the further movement by a gradual compression of the said surface. There is thus obtained a marked regularity in the increase of the rigidity opposing the relative movement of the two frames but, on the contrary, the strain to which the resilient material is subjected is thus increased locally whereby the behaviour of the resilient material is adversely affected and its deterioration or destruction is encouraged.

A second category of devices forming an integral part of the support is that in which there are attached to the frames two rigid abutment surfaces which are perpendicular to the said frames and separated by a space in which there is preferably arranged another layer of resilient material independent of the first and which, beginning with a certain relative displacement of the frames, becomes compressed between the rigid abutment surfaces and opposes the movement of the said surfaces towards one another.

The localisation of strain in the layer of resilient material working under shearing stress is thus avoided but in this case progressiveness is lacking since the rigidity of the support increases suddenly when the abutment surfaces and the layer of resilient material which separates them come into contact. This arrangement, moreover, involves a certain complication of manufacture on account of the necessity of having two independent layers of resilient material.

The object of the invention is to avoid the disadvantages of the two categories mentioned above while retaining and combining their respective advantages.

The invention is mainly characterised in that a part of the resilient mass is arranged so as to form an abutment under compression between projecting surfaces which are suitably orientated in relation to the direction of the load, a cavity being formed in this part of the fixed mass, the said cavity having a wedge-shaped cross-section with a rapid expansion near the widened part so as to increase very progressively but rapidly the rigidity of the support with the load with the transfer, also progressive, of the increases in the load to the part of material forming an abutment under compression.

If the frames are cylindrical the abutment surfaces will preferably be of plane annular form while if the frames are plane or substantially plane the abutment surfaces will preferably have a substantially cylindrical or prismatic form, or a form of an element of a prism or cylinder.

According to the invention there can also be provided in the resilient mass forming a progressive abutment, a series of either radiating or parallel grooves which increases the size of the space perpendicular to the depressions thus formed and, consequently, the elasticity of the masses when crushed.

The invention also provides in combination with the various devices indicated above a certain displacement of the frames in the direction opposite to the direction of the load so that the resilient support becomes symmetrical or centred again only when a given value of the load is attained, the effect of the progressiveness of the device only coming into action beginning with the said value.

The accompanying drawings show, by way of example only, embodiments of the invention. In the drawings:

Figure 1 is an axial longitudinal section (along line AA' of Figure 2) of a support having concentric frames in the form of sleeves working under shearing stress along its axis.

Figure 2 is a transverse section along line BB' of the said support perpendicular to its axis.

Figure 3 is a perspective view of the said support.

Figure 4 is an enlarged partial view of Figure 1 showing the principle of operation.

Figure 5 is an axial longitudinal section of a modification of a support of the type shown in Figure 1 but with a resilient mass provided with grooves.

Figure 6 is a partial development of a cylindrical section of Figure 5 along line GG.

Figure 7 is an axial section of a support with parallel frames enclosing a resilient mass which works under shearing stress parallel to the plane of the said plates.

Figure 8 is a perspective view of the same support.

Figure 9 is a longitudinal axial section of a modification of a support of the type shown in Figure 7.

Figure 10 is a fragment of transverse section of the same support.

Figure 11 is a perspective view of a modification of a support similar to that shown in Figure 7.

Figure 12 shows a longitudinal section along line I—I of Figure 14 of a support having flat abutment plates, under normal load.

Figure 13 shows a resilient mass and frames of the same support, but in a state of absolute freedom.

Figure 14 shows a section along line III—III of Figure 12.

Figures 1, 2 and 3 show a support having concentric cylindrical frames. A cylindrical sleeve I having an axis XX' is attached (for example by means of a bolt such as 20) to an engine or vibrating body, part of which is shown at 21. An outer sleeve 2 concentric with the sleeve I is connected thereto by a layer 3 of resilient material, such as rubber, adhering permanently to the outer surface of the inner sleeve I and to the inner surface of the outer sleeve 2, so that there can be produced between the sleeves I and 2 considerable relative movements parallel to the axis XX' by the shearing deformation of the resilient material 3. In directions perpendicular to the axis XX', on the contrary, the resilient material 3 works under compression and at the extension between the sleeves I and 2 and has a much lower elasticity.

According to the invention the shearing deformations parallel to the axis XX' and in the direction W of the application of the loads on the support, are limited by providing, on the one hand, on the part 2 a turned-over edge 5 forming an annular plane surface substantially perpendicular to the axis XX' and, on the other hand, on the sleeve I a similar turned-over edge 4 forming an annular plane surface substantially parallel to 5, and placed at a certain distance from the latter. The space between the two surfaces 4 and 5 called "abutment surfaces" is occupied, on the one hand, by a mass of resilient material 7, 7a which covers the said two surfaces and which forms one piece without interruption with the annular mass of resilient material 3 located between the two sleeves I and 2, of which it constitutes an extension and, on the other hand, by a cavity or empty space 8 in the form of an annular groove the height of which diminishes progressively beginning at the periphery of the support as far as I' near the central sleeve I. This diminution follows a law which is explained on Figure 4, the said figure showing diagrammatically the course of the space provided between 7 and 7a.

Figure 4 in fact shows in full lines the right section 10 of the groove 8 in the initial position of the support at rest. The same section is shown in dotted mixed lines at $10_n$ and $10_m$ distorted under the action of two successive loads applied along the direction W and to which loads correspond the relative movements $fm$ and $fn$ of the sleeves I and 2, the said displacements resulting in the equivalent shearing deformations of the annular part 3 of the resilient mass.

The outline 10 shows that the height of the empty space 8 first increases substantially according to a linear function starting from the central sleeve at I' nearly to the points 9a, 9b which are in line with the inner surface of the sleeve 2. The increase is more rapid from the points 9a, 9b to the points 9c, 9d near the periphery of the support and is finally very rapid from the latter points to the periphery of the support, so that the mass of rubber 7 forms a kind of padding covering the abutment surface 5.

The result of this arrangement as shown by the outlines $10_m$ and $10_n$ is that the relative displacement of the parts I and 2 under the action of increasing loads progressively closes the space 8 at the centre of the periphery without imposing excessive strains on the resilient mass working under shearing stress at 3. In effect, in the position $10_n$, for example, a considerable part of the load is transferred to the padding 7 which, working under compression, begins to project outwardly although the bottom of the cavity 8 has hardly become closed.

Owing to the wedge-shaped section of the cavity 8 and its rapid expansion near the periphery the conditions of the main feature of the invention are obtained, the part of the resilient material 3 working under shearing stress being no longer subjected to excessive strain as in the systems hitherto employed.

The embodiment shown in Figure 5 differs from the support which has just been described in that the abutment surface 4a moving integrally with the central sleeve I consists of a separate part which simplifies the moulding of the support and dispenses with forming the groove during moulding or the hollowing out of the material. Another difference consists also in that the portion of resilient material which forms a progressive abutment, as previously explained, does not possess a uniform thickness round the support but forms an alternate series of grooves consisting of the series of projections 7b and depressions 8a as shown in Figure 6. The said grooves are preferably orientated radially around the axis XX'. This arrangement, in accordance with one of the features of the invention, increases the elasticity during crushing of the masses of resilient material while allowing the lateral expansion of the projections 7b in the recesses 8a when they abut on the disc 4a under heavy loads.

Figures 7 to 11 relate to supports according to the invention having frames of substantially plane form.

Figure 7 shows one embodiment of this type which comprises two circular frames Ia and 2a separated from one another by a layer of resilient material 3a which adheres closely to the opposite circular faces of the said frames in such a way that considerable relative movements of the frames Ia and 2a are allowed parallel to their planes by the shearing deformation of the resilient material, while in the direction perpendicular to the said frames the resilient material works under compression or under tension. The frames Ia and 2a are connected by bolts 20a and 20b respectively to the engine or vibrating body 21 and to the supporting framework or structure 22 or inversely.

According to the invention the frames Ia and 2a are provided with two cylindrical rims 4d and 5d arranged substantially concentrically. They thus provide an annular space which is partly filled by masses of resilient material 7c and 7d which extend in a continuous manner the mass 3a working under shearing stress between the frames 1a and 2a. The said masses 7c and 7d are separated by an annular space 8d which has a wedge-shaped cross-section the apex of which is on the side of the frame 1a and the height of which increases rapidly to form a widened portion towards the outside of the support in accordance with the law already defined in Figure 4.

This embodiment also enables the characteristic principle of the invention to be obtained for the support in question, namely that the rigidity of the support increases rapidly with the relative movements of the frames 1a and 2a parallel to their plane but in this case this property exists in all directions of a plane instead of being limited to a single direction as in the case of the preceding supports.

Figure 8 is a perspective view of the support of Figure 7.

Figures 9 and 10 relate to a modification of a support similar to that shown in Figure 7. The outer abutment surface 4e no longer forms an integral part of the frame but takes the form of an inserted cup. Finally the portions of resilient material forming a progressive abutment comprise grooves of the type of those already described in connection with Figures 5 and 6. There is an alternate succession of projections 7f and depressions 8e for the purpose of increasing, in accordance with the invention, the progressiveness of the resilient reaction of the masses of material forming abutments.

There is also shown in Figure 9 another feature of the invention which consists in displacing the opposite frames 1a and 2a to a distance D which equals the distance between the axes YY' and ZZ' of the bolts 20a and 20b for fixing the said support which is assumed to be in the free state without load. A support arranged in this way becomes symmetrical again when the displacement D is made up for by a suitable load applied on the support parallel to the direction of the arrow W.

Figure 11 shows in perspective a modification of the support having frames arranged in parallel planes but in which a rectangular form is adopted. The frames 1b and 2b carrying respectively the fixing bolts 20c, 20d, 20e, 20f are substantially parallel to one another and are connected by the mass of resilient material 3c of substantially constant thickness and working under shearing stress for any relative displacement of the two frames parallel to their plane under variable loads applied in the direction W. In order to limit the said relative displacements the said frames are provided with turned-over edges 4f and 5f, the space between which is occupied, according to the invention and as already indicated for the supports described, by masses of resilient material 7g, 7h derived from one piece with the shearing mass and which provides a hollow space 8f, the wedge-shaped cross-section of which has the same characteristics of operation which have been explained in connection with Figure 4 and which embody the principal feature of the invention.

Further modifications of the supports will now be described which are specifically adapted for certain working conditions as, for example, where the supports are subjected to a fixed load in a given direction, and eventually also supporting, in the same direction, forces which are variable but in both directions, while having relatively to the said forces a rigidity which increases progressively from a certain value of the relative displacement of their frames, either in one direction or the other. For this purpose, the resilient material of the supports is given a form having preferably under the fixed load a certain symmetry in such a way as to provide two combinations of abutments, one for the direction of the variable forces, the other for the opposite direction.

The abutment members for the resilient material can, if desired, especially in the case of plane members, be previously given a certain permanent deformation, so as to adjust the support in accordance with a certain law of operation.

According to a further feature of the invention and this applies particularly to the case of flat frames, the abutment surfaces for two resilient masses, forming only a single mass, will be also merged into a single surface, which is preferably integral with the two outer frames of the support.

Figures 12 to 14 show on the whole devices of the same kind as those of Figures 1 to 7, but with a double combination of abutments, such that the rigidity increases progressively from a certain amplitude of deformation in both directions along the axis XX' of their frames. On both sides of the outer frame there are provided on the resilient material a pad or pads 7, 7' adapted to abut at a given moment against the surfaces 4a, 4'a, which preferably consist of simple discs.

As already stated, the law of operation can be varied according to the type of application of the support, by previously shaping or deforming permanently the said surfaces, for example, by giving the plates 4a and 4'a a conical shape.

As already described the resilient masses are arranged so that when they are quite at rest, without initial static load W, the frames have a certain displacement between them equal to their deflection $fn$ under the load W (Figure 13).

Thus in the supports, according to the invention, the resilient masses in the state of absolute freedom on its frames will not be symmetrical (Figure 13) but will become symmetrical as soon as the said support is subject to a permanent load W.

However, this is not absolutely necessary since by altering the permanent deformation or conicity of the abutment surfaces 4a, 4'a, the amplitude of the movements permitted about any mean position can be regulated.

The supports shown in Figures 12 to 14 have an outer frame 2 provided with a groove 2c. The said frame 2 is fixed to the framework with which it must be integral for example by means of a collar in two parts 22a, 22b, assembled by screws or bolts, such as 22c.

I claim:

1. A resilient support comprising rigid members having substantially parallel surfaces connected by a mass of resilient material with one of said surfaces extending beyond the other, resilient material adhesively connected to said surface extension, a flange on one of said members, resilient material connected to said flange and an abutment extending laterally of said surface extension and defining with said last-named resilient material a V-shaped space with one side curved.

2. A resilient support comprising rigid members having substantially parallel surfaces connected by a mass of resilient material with one of said surfaces extending beyond the other, resilient material adhesively connected to said surface extension, a flange on one of said members, resilient material connected to said flange and an abutment extending laterally of said surface extension and defining with said last-named resilient material a curvilinear triangle whose curved side is formed by the resilient material, the apex of said triangle terminating adjacent the member having a surface extension.

3. A resilient support comprising rigid members having substantially parallel surfaces connected by a mass of resilient material with one of said surfaces extending beyond the other, resilient material adhesively connected to said surface extension, a flange on one of said members, resilient material connected to said flange and an abutment extending laterally of said surface extension and defining with said last-named resilient material a V-shaped space with one side curved, the abutment having resilient material extending thereover.

4. A resilient support comprising rigid members having substantially parallel surfaces connected by a mass of resilient material with one of said surfaces extending beyond the other, resilient material adhesively connected to said surface extension, a flange on one of said members, resilient material presenting a ribbed surface connected to said flange and an abutment extending laterally of said surface extension and defining with said last-named resilient material a V-shaped space with one side curved.

MAURICE FRANÇOIS
ALEXANDRE JULIEN.